(12) United States Patent
Kahn et al.

(10) Patent No.: US 10,945,005 B2
(45) Date of Patent: Mar. 9, 2021

(54) MULTIPLE PARENTAL RATING CONTENT AND METHOD OF PRESENTATION

(71) Applicant: ARRIS Enterprises LLC, Suwanee, GA (US)

(72) Inventors: Michael R. Kahn, Cherry Hill, NJ (US); Thomas L. Du Breuil, Ivyland, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/213,170

(22) Filed: Dec. 7, 2018

(65) Prior Publication Data

US 2020/0186851 A1    Jun. 11, 2020

(51) Int. Cl.
| | |
|---|---|
| H04N 7/16 | (2011.01) |
| H04N 21/2343 | (2011.01) |
| H04N 21/233 | (2011.01) |
| H04N 21/235 | (2011.01) |
| H04N 21/239 | (2011.01) |
| H04N 21/262 | (2011.01) |
| H04N 21/2668 | (2011.01) |
| H04N 21/472 | (2011.01) |
| H04N 21/845 | (2011.01) |
| H04N 21/858 | (2011.01) |

(52) U.S. Cl.
CPC ..... *H04N 21/23439* (2013.01); *H04N 21/233* (2013.01); *H04N 21/2353* (2013.01); *H04N 21/2393* (2013.01); *H04N 21/2668* (2013.01); *H04N 21/26241* (2013.01); *H04N 21/47202* (2013.01); *H04N 21/8455* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 5,778,135 A | * | 7/1998 | Ottesen ............. | H04N 7/17318 386/282 |
| 5,838,384 A | * | 11/1998 | Schindler ............ | G06F 3/14 348/563 |

(Continued)

FOREIGN PATENT DOCUMENTS

EP    2001197 A2    12/2008

OTHER PUBLICATIONS

Notification of Transmittal of the International Search Report (Form PCT/ISA/220 and PCT/ISA/210) and the Written Opinion of the International Searching Authority (From PCT/ISA/237) dated Jul. 16, 2020, by the International Application Division European Patent Office in corresponding International Application No. PCT/US2019/060437. (17 pages).

*Primary Examiner* — William J Kim
(74) *Attorney, Agent, or Firm* — Buchanan Ingersoll & Rooney PC (57) ABSTRACT

A method is provided for presenting a program having a selected program rating when a user request is received through a client device to present a program at a selected program rating level. A version of the program is selected from among a plurality of different versions which corresponds to the selected program rating level. The selected version of the program is caused to be presented on a display device associated with the client device.

10 Claims, 8 Drawing Sheets

(56) References Cited

U.S. PATENT DOCUMENTS

| | | | |
|---|---|---|---|
| 5,953,485 A * | 9/1999 | Abecassis | A63F 13/10 386/278 |
| 5,973,683 A * | 10/1999 | Cragun | H04N 7/163 348/E7.061 |
| 8,041,190 B2 * | 10/2011 | Candelore | G11B 27/034 386/287 |
| 8,079,044 B1 * | 12/2011 | Craner | H04N 21/4532 725/28 |
| 8,896,765 B1 * | 11/2014 | White | H04N 5/4403 348/734 |
| 10,142,666 B2 * | 11/2018 | Brondijk | H04N 21/2362 |
| 2002/0013941 A1 * | 1/2002 | Ward, III | H04N 7/163 725/25 |
| 2002/0120931 A1 | 8/2002 | Huber | |
| 2003/0163811 A1 * | 8/2003 | Luehrs | H04N 5/44543 725/25 |
| 2004/0158870 A1 * | 8/2004 | Paxton | H04N 7/17336 725/115 |
| 2005/0259559 A1 * | 11/2005 | Knox | G11B 19/04 369/275.3 |
| 2006/0130118 A1 * | 6/2006 | Damm | H04L 63/0245 725/135 |
| 2006/0130119 A1 | 6/2006 | Candelor | |
| 2006/0130121 A1 * | 6/2006 | Candelore | G11B 27/034 725/145 |
| 2006/0184977 A1 * | 8/2006 | Mueller | H04H 20/38 725/86 |
| 2007/0033610 A1 * | 2/2007 | Sohn | H04N 7/163 725/28 |
| 2008/0134253 A1 * | 6/2008 | Romain | H04N 7/17318 725/61 |
| 2010/0161825 A1 * | 6/2010 | Ronca | H04N 21/23424 709/231 |
| 2010/0162289 A1 | 6/2010 | Sanders | |
| 2010/0232758 A1 | 9/2010 | Cook | |
| 2010/0333132 A1 | 12/2010 | Robertson | |
| 2011/0307545 A1 * | 12/2011 | Bouazizi | H04N 21/234345 709/203 |
| 2011/0314130 A1 * | 12/2011 | Strasman | H04L 29/06 709/219 |
| 2012/0016917 A1 * | 1/2012 | Priddle | H04N 5/91 707/827 |
| 2012/0167128 A1 | 6/2012 | Bradley | |
| 2012/0194742 A1 * | 8/2012 | Barnes | H04N 5/44513 348/569 |
| 2013/0262694 A1 * | 10/2013 | Swaminathan | H04L 65/4084 709/231 |
| 2013/0291004 A1 * | 10/2013 | Yuan | G06F 21/6218 725/28 |
| 2014/0013376 A1 * | 1/2014 | Xu | H04N 21/25 725/116 |
| 2014/0189727 A1 | 7/2014 | Chen | |
| 2014/0208340 A1 * | 7/2014 | Poornachandran | H04N 21/44218 725/10 |
| 2014/0229968 A1 * | 8/2014 | Francisco | H04N 21/25875 725/16 |
| 2015/0095014 A1 * | 4/2015 | Marimuthu | G06F 17/2735 704/9 |
| 2015/0128164 A1 * | 5/2015 | Fundament | G06F 3/04883 725/25 |
| 2015/0271554 A1 * | 9/2015 | Shetty | H04N 21/4542 725/28 |
| 2015/0334335 A1 * | 11/2015 | White | H04N 21/4126 348/734 |
| 2016/0381399 A1 * | 12/2016 | Brondijk | H04N 21/2362 725/116 |
| 2018/0035072 A1 * | 2/2018 | Asarikuniyil | H04N 21/8126 |
| 2018/0310042 A1 * | 10/2018 | Mayalil | H04N 21/242 |

* cited by examiner

FIG. 8 ns a single uncen-
MULTIPLE PARENTAL RATING CONTENT AND METHOD OF PRESENTATION

BACKGROUND

Today, there is content available from many sources and increases in bandwidth have enabled multiple audio tracks to accompany an individual video program. These can include audio tracks in multiple foreign languages, and descriptive video services.

Content is often rated as being suitable for audiences of different ages. In the U.S., for instance, TV ratings include TV-Y, TV-Y7, TV-G, TV-PG, TV-14, and TV-MA. In addition, some content is unrated, with no designation at all. Movies in the U.S. use a slightly different rating system, but the concept is similar. Canada and other countries also employ rating systems that may have different rating levels, but the concept again is similar. The primary purpose of the rating is to assist parents in controlling which content their children are exposed to.

SUMMARY

In accordance with one aspect of the techniques described herein, a method is provided for presenting a program having a selected program rating. In accordance with the method, a user request is received through a client device to present a program at a selected program rating level. A version of the program is selected from among a plurality of different versions which corresponds to the selected program rating level. The selected version of the program is caused to be presented on a display device associated with the client device.

In accordance with another aspect of the techniques described herein, a method is presented for providing to a client device over a network a program that is presentable at a plurality of program rating levels that are user selectable. In accordance with the method, a transport stream is generated that includes (i) a primary video stream and a corresponding primary audio stream, and (ii) at least one alternate audio segment or alternate video segment that is respectively substitutable for a corresponding audio segment in the primary audio stream or a corresponding video segment in the primary video stream. The alternate audio segment or alternate video segment is respectively substitutable to change the program rating level of the program. The transport stream is transmitted to the client device over the network.

In accordance with yet another aspect of the techniques described herein, a method is presented for providing to a client device over a network a program that is presentable at a plurality of program rating levels that are user selectable. In accordance with the method, a user request is received from the client device over the network for a manifest associated with a program provided in an ABR transport stream. The user request includes an indicator specifying a desired program rating level. Responsive to the user request, the manifest is sent to the client device over the network. The manifest includes links to media files that specify at least one alternate audio segment or alternate video segment that is respectively substitutable for a corresponding audio segment in the primary audio stream or a corresponding video segment in the primary video stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

As explained in more detail below, a program (e.g., a television program, a movie or other content items) may be made available in different versions that each reflect a different program rating level. More specifically, different versions of a primary, uncensored program may be provided that each replaces one or more audio segments and/or video segments with a different segment that is acceptable for its desired program rating level. For instance, in the case of an audio segment that has offensive or otherwise inappropriate audio that will not meet the desired program rating, the audio segment can be replaced with an alternate segment that mutes, bleeps out or overdubs the inappropriate audio.

For instance, if the program is delivered as an MPEG transport stream, the transport stream may include alternate elementary audio and/or video streams, each identified by a unique packet identifier (PID), which each correspond to a differently rated version. As an example, consider a program of a stand-up comedy act. The MPEG transport stream can include a video PID specifying the video stream, and multiple audio PIDs each specifying different audio streams. One audio stream may include the unrated (uncensored or unedited) audio from the stand-up comedy act. Another audio stream may contain a censored audio track that includes most of the original audio, but muting, bleeping, or overdubbing certain words deemed inappropriate for that rating level. Another audio stream can include a more heavily censored audio track that mutes/bleeps even more audio. In this way, a program can be presented in its most appropriate ratings, based on a user preference that can be selected via the client device (e.g., set top box, smartphone). Once the user selects a desired rating level, the client device selects the corresponding audio stream using its PID. A similar approach may employed for video segments that need to be toned down or otherwise edited to achieve a certain rating level, so multiple video streams may be provided and accessed in the same fashion.

The techniques described herein allow certain viewers to experience content with one rating level, while other viewers can experience the content with another rating level. As an example, it may desirable to increase the amount of censoring for younger viewers, while adult viewers may enjoy content more with less censoring. In some cases, there may be a varied audience viewing content together. In this case, in some embodiments, content can be presented at various rating levels. That is, in some embodiments the content can be simultaneously provided at two different rating levels while both viewers are in the same location, viewing the content on the same display device. In this way, an improved user experience can be achieved, while still maintaining the desired rating level for different viewers as needed.

Of course, the techniques described herein may be used to deliver programming in a format other than an MPEG transport stream. More generally, the techniques described herein are applicable to any content delivery mechanism that may be employed including, as just one other example, adaptive bit rate (ABR) streaming techniques. In the case of ABR streaming, different URLs may be provided in the manifests for the different versions or profiles that are available.

Figure 1:
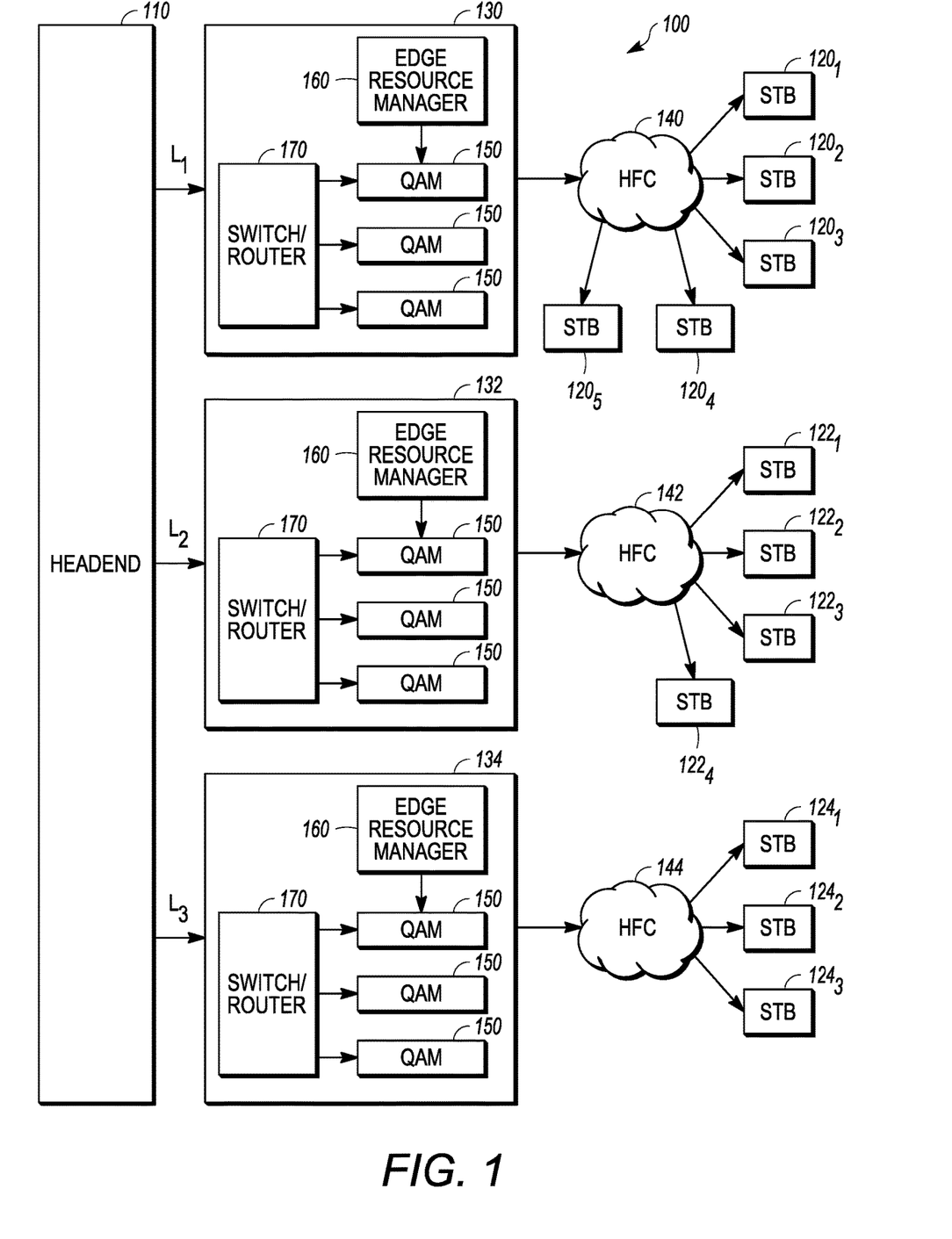
FIG. 1 is one example of a system architecture for delivering programming content to end user client devices such as set top boxes.

FIG. 1 is one example of a system architecture 100 for delivering programming content to end user client devices such as set top boxes. Among other components, system architecture 100 comprises a content source such as a headend 110 that delivers the content to the end users over a content delivery system that in this example includes multiple intermediate entities such as hubs 130, 132 and 134. In particular, the headend 110 communicates with a switch or router 170 in hubs 130, 132 and 134 over links L1, L2 and L3, respectively. The headend 110 and hubs 130, 132 and 134 may communicate over a packet-switched network such as a cable data network, passive optical network (PON) or the like using, for example, IP multicast or unicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user client devices, which for purposes of illustration in this example are set top boxes. In the example of FIG. 1, access network 140 communicates with set top boxes $120_1$, $120_2$, $120_3$, $120_4$ and $120_5$, access network 142 communicates with set top boxes $122_1$, $122_2$, $122_3$ and $124_4$, and access network 144 communicates with set top boxes $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) decapsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by a system operator that operates the network.

Each hub 130, 132 and 134 also includes an edge resource manager 160 for allocating and managing the resources of the edge devices 150. The edge resource manager 160 communicates with and receives instructions from the session manager located in the headend 110.

When a viewer selects a channel using an end user device such as a set top box, the system actively switches the channel onto one of the QAMs that serves that particular set top box. The set top boxes are generally arranged into service groups and each of the service groups is assigned to, and serviced by, one or more QAM modulators. For example, in the arrangement depicted in FIG. 1 set top boxes $120_1$, $120_2$, $120_3$, $120_4$ and $120_5$ are assigned to QAM modulators 150 located at hub 130, set top boxes $122_1$, $122_2$, $122_3$ and $122_4$ are assigned to QAM modulators 150 located at hub 132, and set top boxes $124_1$, $124_2$ and $124_3$ are assigned to QAM modulators 150 located at hub 134. Typically, four (4) or eight (8) QAM modulators are deployed per service group to carry the channels. Service groups currently include from about 500 to 1000 set top boxes. Depending on the system topology, there may or may not be a one-to-one correspondence between the hubs and the service groups. For instance, it is typically the case that each hub serves multiple service groups.

The digitally encoded content is transmitted by the headend 110 in a digital transport stream that is arranged in a predetermined media format. For instance, the content may be arranged in accordance with an MPEG media format, such as the MPEG-2 media format, but may be arranged in accordance with other media formats, including but not limited to other MPEG formats, Hypertext Markup Language (HTML), Virtual Hypertext Markup Language (VHTML), X markup language (XML), H.261, or H.263 formats. An individual program generally composes a single program transport stream. The single program transport stream includes the various program elementary streams such as video, audio and data elementary streams. The single program transport stream also includes program specific information associated with the elementary streams such as system tables, which in the case of MPEG, for example, includes the Program Map Table (PMT). The PMT describes the elementary streams (e.g., video, audio and data streams) that compose the program being recorded. The PMT specifies the packet identifiers (PIDs) for each elementary stream. For instance, a video program will generally include a video and audio PID as well as certain other PIDs such as a Program Clock reference (PCR) PID and an Entitlement Control Message (ECM) PID. A digital transport stream may include a series of single program transport streams, each of which can be identified by the various PIDs with which they are associated.

Figure 2:
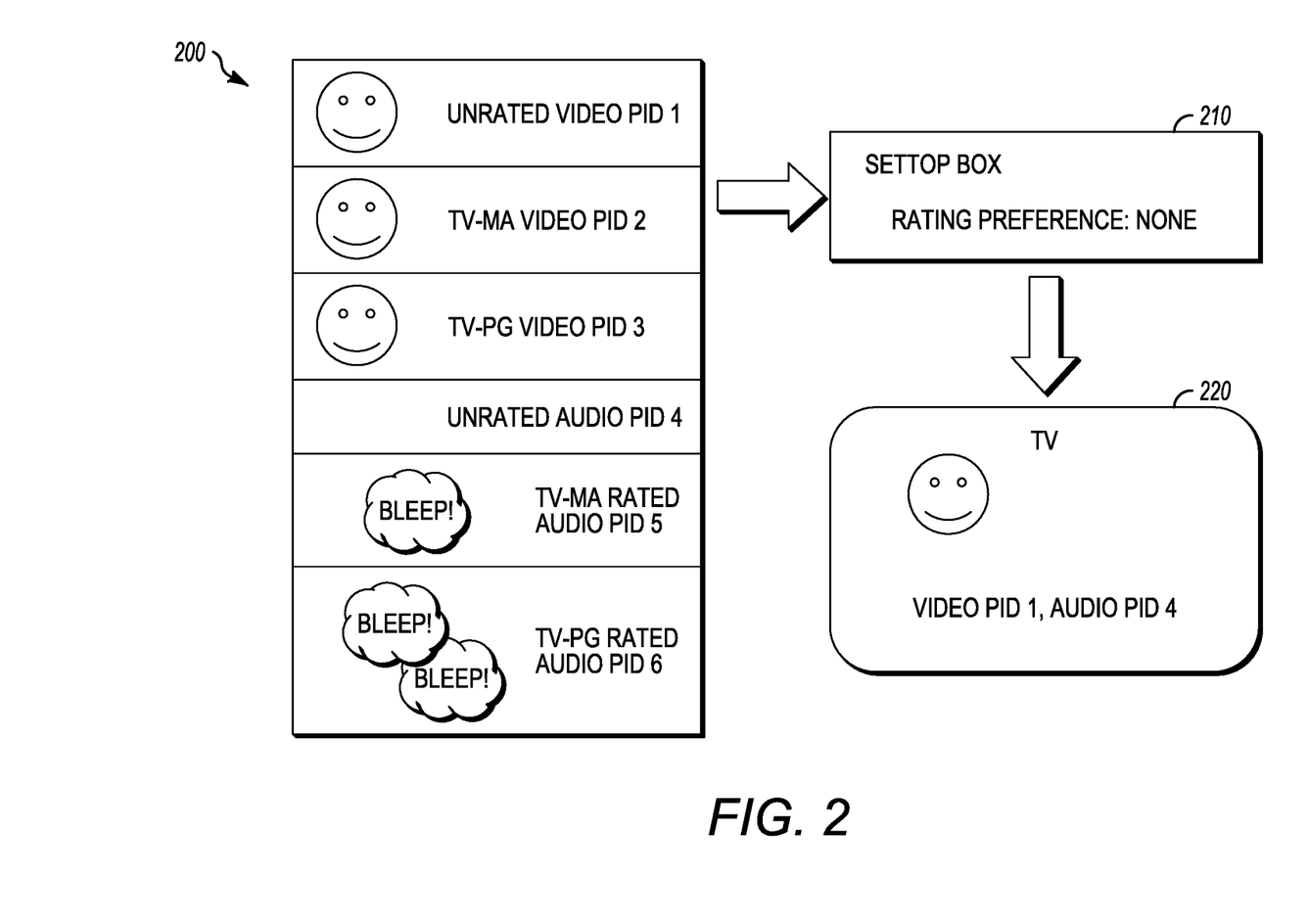
FIG. 2-5 depict a representation of a program that is provided as a transport stream with three video versions corresponding to an unrated version, a TV-MA rated version and a TV-PG rated version.

In the case of an MPEG transport stream, when a user selects programming content with a desired rating level via the user interface of their client device, the client device specifies the PIDs for the appropriate video and audio elementary streams corresponding to the desired rating. For instance, FIG. 2 depicts a representation of a program 200 that is provided as a transport stream with three video versions corresponding to an unrated version (identified by video PID 1), a TV-MA rated version (identified by video PID 2) and a TV-PG rated version (identified by video PID 3). Likewise, the program 200 that is provided with three audio versions corresponding to an unrated version (identified by audio PID 4), a TV-MA rated version (identified by audio PID 5) and a TV-PG rated version (identified by audio PID 6). If, as shown in the figure, the user selects the rating preference NONE via the client device (a set top box 210 in this example), then the unrated video and audio is presented on the display device such as the television 220.

Figure 3:
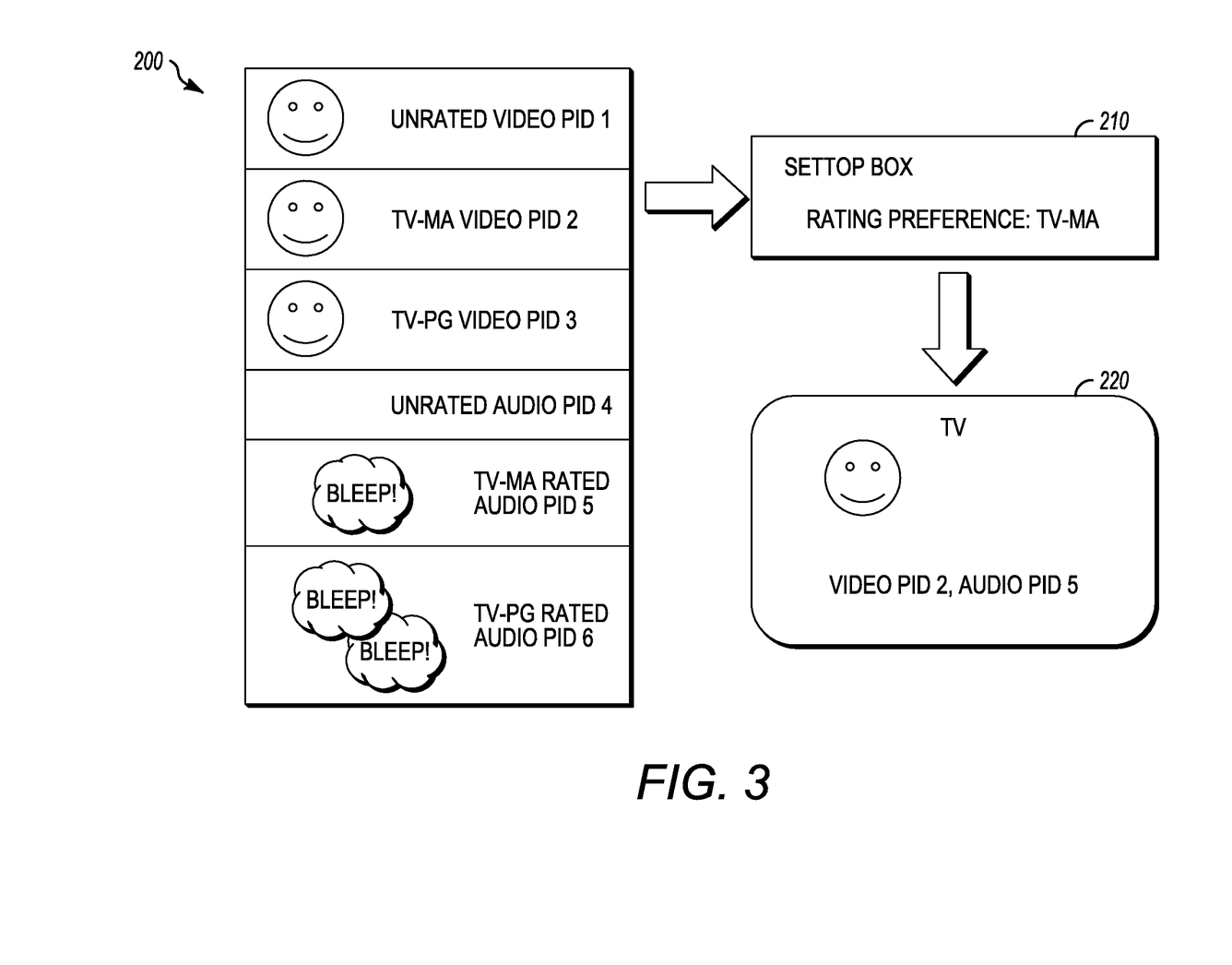
Figure 4:
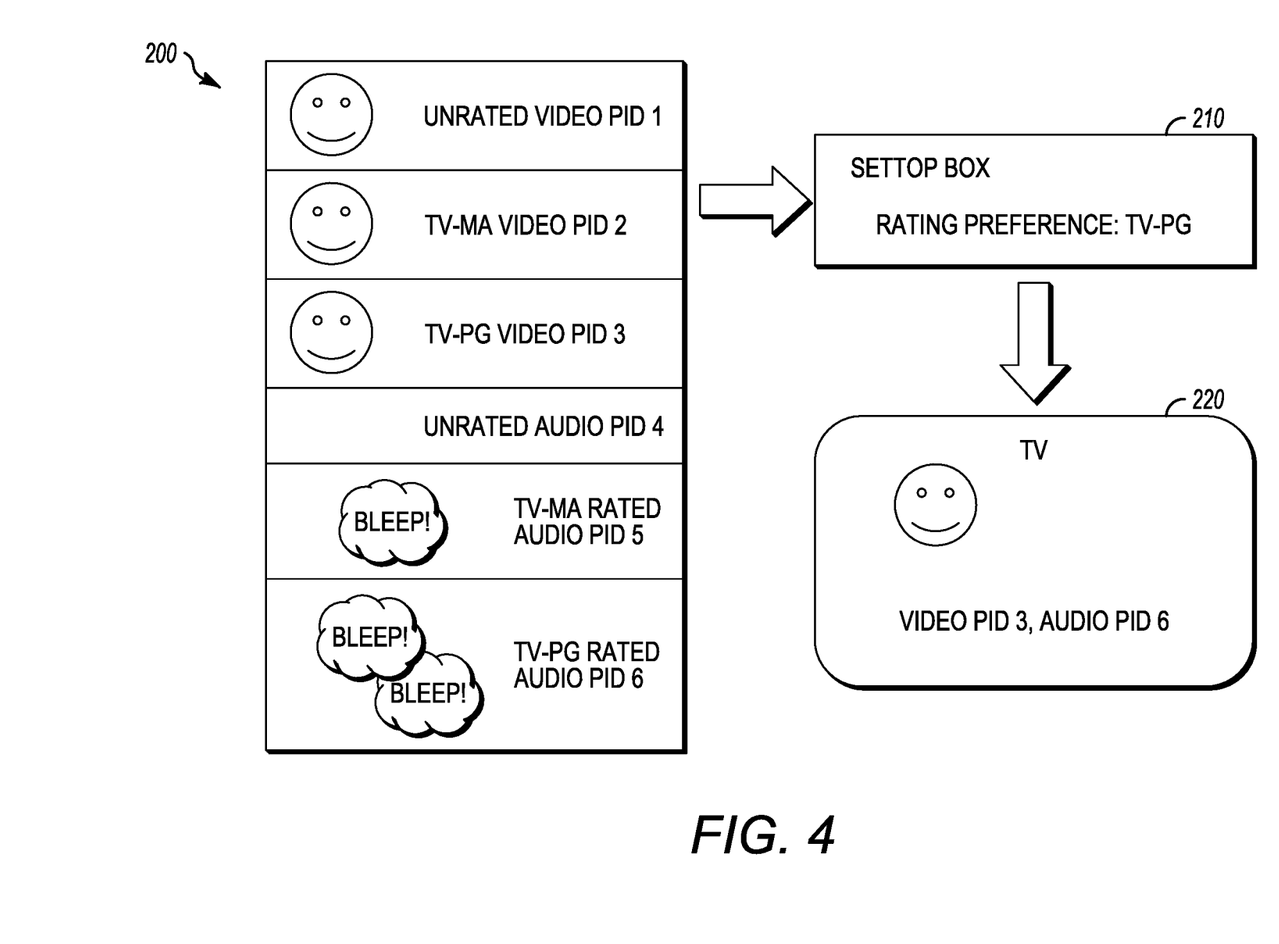

In FIG. 3, the user prefers the version of the program 200 having a TV-MA rating and as a consequence a version of the program 200 specified by video PID 2 and audio PID 5 is presented on the television 220. In a similar way, if as shown in FIG. 4 the user prefers the version of the program 200 having a TV-PG rating a version of the program 200 specified by video PID 3 and audio PID 6 is presented on the television 220.

Figure 5:
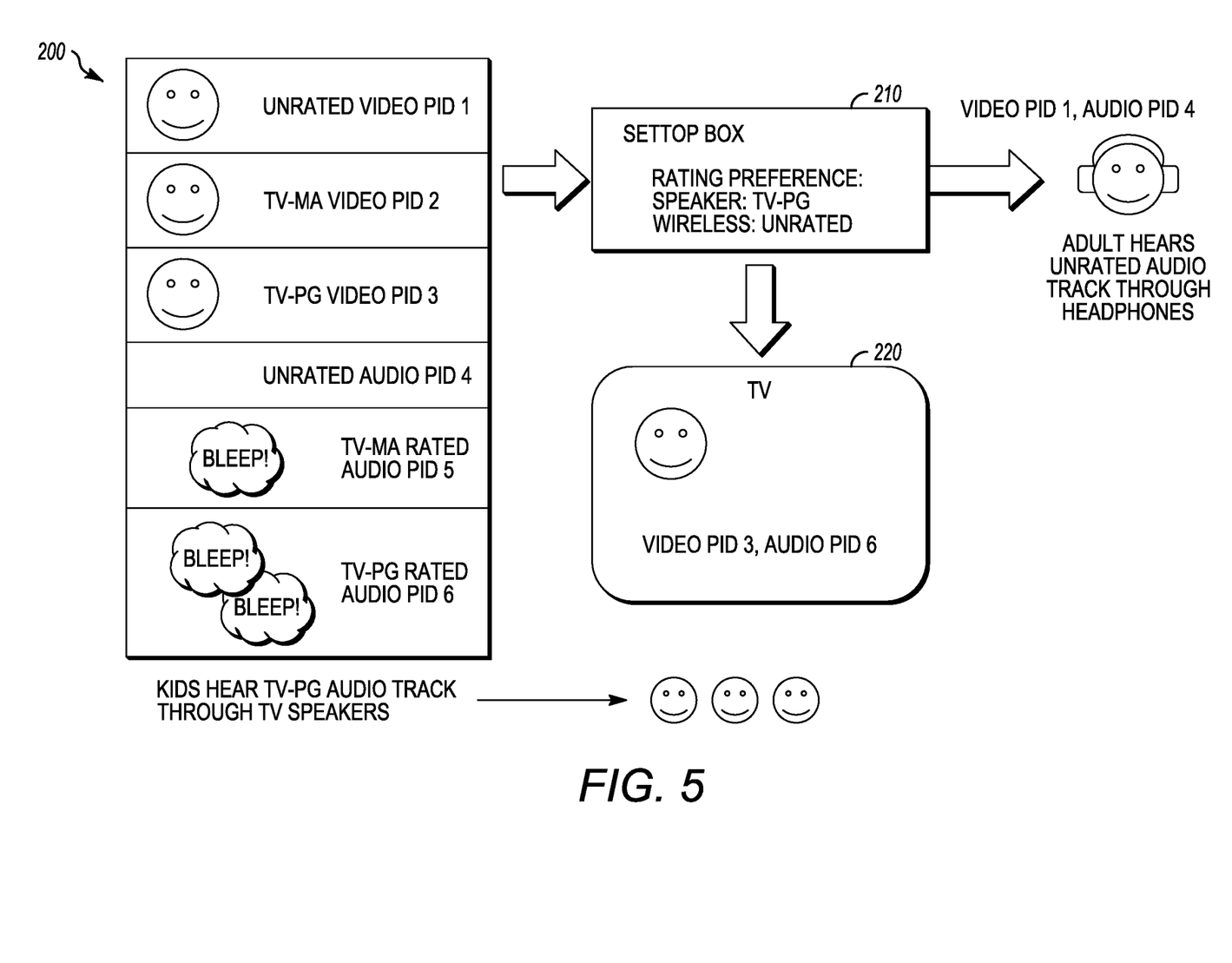

In one embodiment, the user may be presented with the option of sending two different versions of the program to two different devices. For instance, in FIG. 5, the user is able to send one audio version of the program 200 to speakers associated with the television 220 and another audio version to headphones 230 (via, e.g., Bluetooth, Wi-Fi, etc). In this way, for instance, a TV-PG version may be presented for children through the speakers while adults, viewing the same video stream on the television 220 as the children, may be presented with the unrated audio through the headphones 230. If it happens that there is an alternate TV-PG video version of the program 200, then this would be the video that is presented rather than the unrated video version. That is, the lower rated video will be presented when two different audio versions are being presented since both listeners with independent audio tracks are sharing the same video display.

In some embodiments, instead of transmitting different versions of the audio and/or video streams in their entirety, a singled uncensored version is transmitted and only the replacement segments of the audio and/or video of the alternate versions are sent along with it. In this way bandwidth can be conserved since redundant information need not be transmitted over the network. In most cases, the video and/or audio for each track will be identical. The differences only occur when a scene or a segment of dialog, music, etc., warrants censoring or alternate content, based on rating level. This embodiment is depicted by the representation of the program 500 in FIG. 6.

Figure 6:
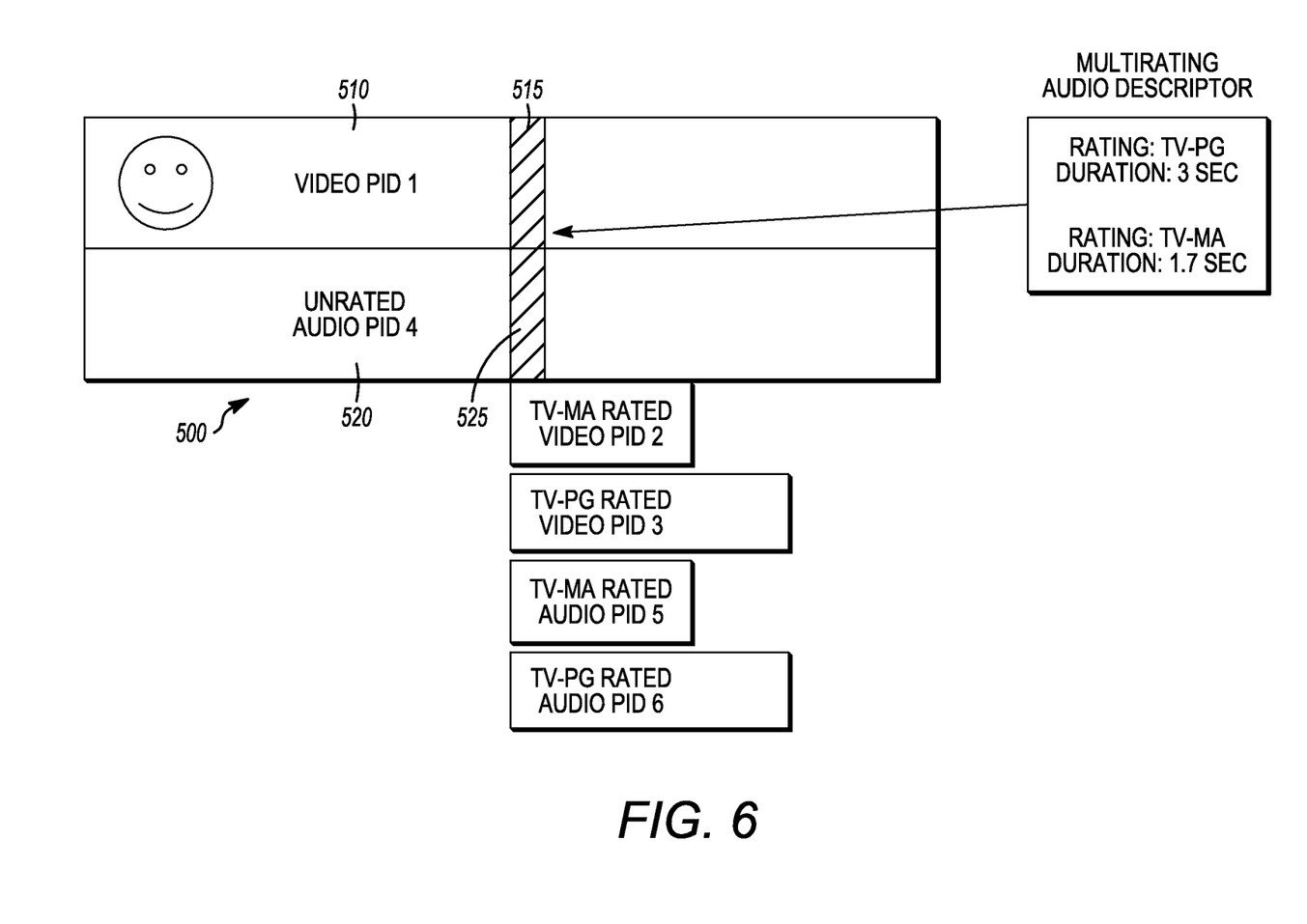
FIG. 6 depicts a representation of a program that is provided as a transport stream that includes a single uncensored or unedited version and additional segments that can be used to replace corresponding segments in the uncensored version in order to obtain versions of the program having different rating levels.

FIG. 6 shows the video stream 510 and the audio stream 520 of the program 500. In this example the unrated video stream is specified by PID 1 and the unrated audio stream is represented by PID 4. A video ratings descriptor 515 and an audio ratings descriptor 525 are present in the unrated video and audio streams, respectively, in advance of the content portion(s) that needs to be altered. As shown, the ratings descriptors indicate the alternate rating level(s) that is available and the duration of the alternate segments. Also included in the descriptors are splice in and splice out points specifying the locations where the alternate segments are to begin and end, respectively. Alternately, only the splice in point and the duration may be specified. When the client device decodes the uncensored video and audio, it reads the descriptors and checks the current rating preference, and temporarily switches to the content represented by the appropriate content PIDs as warranted by the rating preference. If, for example, the program is delivered in an MPEG transport stream, the descriptors may be located in the PMT and the splice points may be indicated using conventional techniques such as in-band SCTE35 markers as defined by the Society of Cable and Telecommunications Engineers (SCTE), which are normally used to specify points at which advertisements are to be inserted. Of course, any other suitable descriptors and spice point indicators may be employed, depending in part on the type of transport stream that is being transmitted.

As an example, if the selected rating for the program 500 in FIG. 6 is TV-MA, and there is some audio that exceeds this rating, the client device will switch from the audio stream specified by PID 4 to the audio stream specified by PID 6 for 1.7 seconds, and then return to the audio stream specified by PID 4. The audio stream specified by PID 6 may contain muted, bleeped, or overdubbed audio to present an appropriate experience for the TV-MA rating level.

Similarly, if the selected rating for the program 500 is TV-PG, and there is some audio that exceeds this rating, the client device will switch from the audio stream specified by PID 4 to the audio stream specified by PID 5 for 3 seconds, and then return to audio stream specified by PID 4. PID 5 may contain muted, bleeped, or overdubbed audio to present an appropriate experience for the TV-PG rating level. In a similar way alternate video segments can be presented when a video sequence exceeds the selected rating. It should be noted that alternate video and audio segments may or may not occur in the same place in the program and may or may not be of the same duration in each instance. Because the alternate audio and video segments (represented in this example by PIDs 2, 3, 5 and 6) have relatively short durations, considerable delivery bandwidth is saved as well as storage space for the original content at the programmer location.

The examples presented above of the techniques described herein have largely been in the context of traditional video distribution of either linear TV or video-on-demand (VOD) streams via networks utilizing direct broadcast satellite (DBS), over-the-air, cable or telecommunication distribution systems. However, as mentioned above, these techniques can be further extended to other content delivery systems such as those employing adaptive bitrate (ABR) streaming for IP delivery, typically via http or https. An example of a content delivery system that employs ABR will now be presented in FIG. 7.

Figure 7:
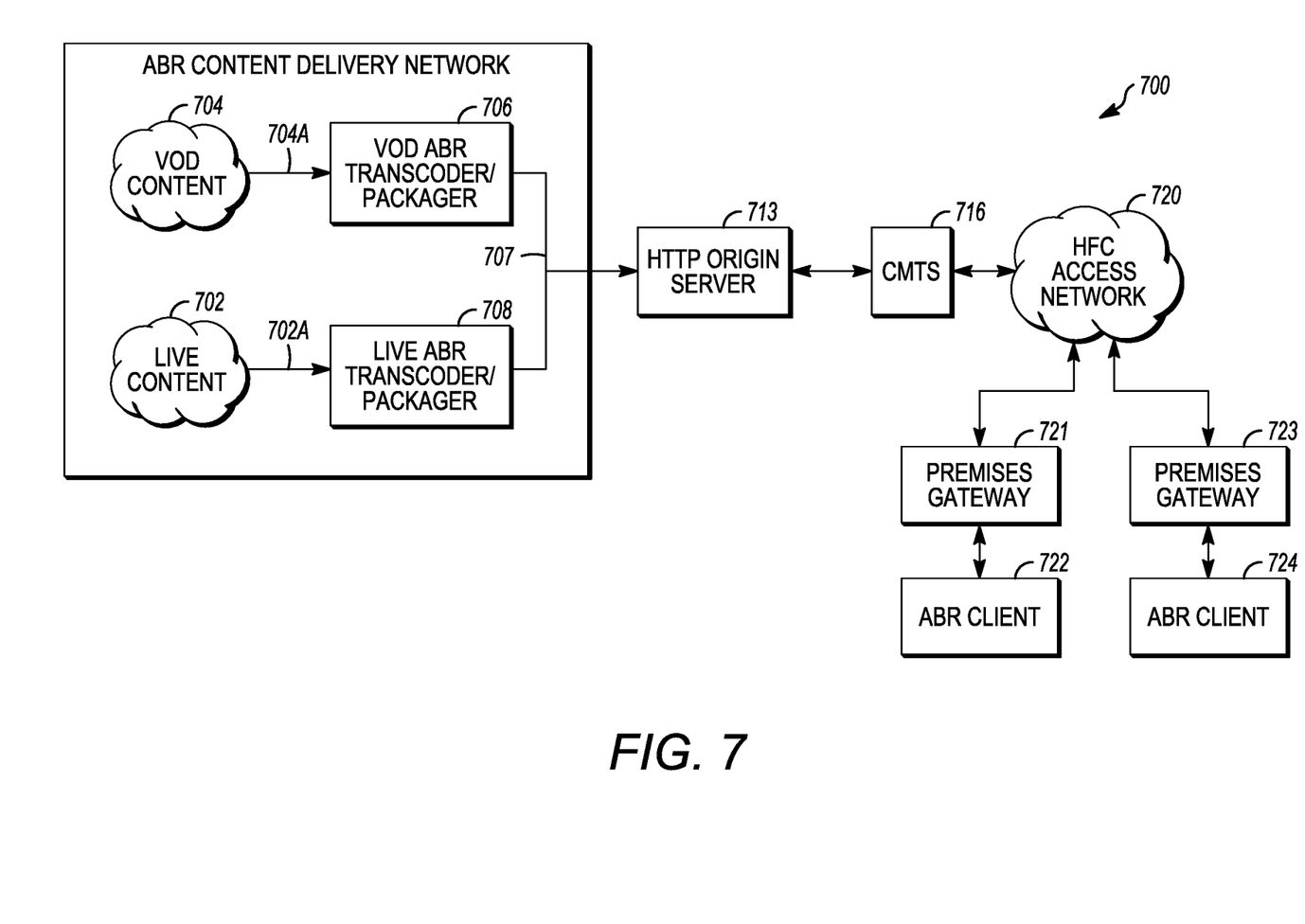
FIG. 7 depicts a high level functional block diagram of a representative adaptive bit rate system that delivers content to adaptive bit rate client devices over an access network such as a hybrid fiber-coax (HFC) network.

FIG. 7 depicts a high level functional block diagram of a representative adaptive bit rate system 700 that delivers content to adaptive bit rate client devices 722 and 724 via an access network 720 such as a hybrid fiber-coax (HFC) network. An adaptive bit rate client device is a client device capable of providing streaming playback by requesting an appropriate series of segments from an adaptive bit rate system 700. The content provided to the adaptive bit rate system 700 may originate from a content source such as live content source 702 or video on demand (VOD) content source 704.

An adaptive bit rate system, such as the adaptive bit rate system 700 shown in FIG. 7, uses adaptive streaming to deliver content to its subscribers. Adaptive streaming, also known as ABR streaming, is a delivery method for streaming video using an Internet Protocol (IP). As used herein, streaming media includes media received by and presented to an end-user while being delivered by a streaming provider using adaptive bit rate streaming methods. Streaming media refers to the delivery method of the medium, e.g., http, rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using adaptive bit rate methods are included in the references to "media" and "streaming."

Adaptive bit rate streaming is a technique for streaming multimedia where the source content is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a chunk is a small file containing a short video segment (typically 2 to 10 seconds but can be as short as a single frame in some implementations) along with associated audio and other data. Sometimes, the associated audio and other data are in their own small files, separate from the video files and requested and processed by the client(s) where they are reassembled into a rendition of the original content. Adaptive streaming may use, for instance, the Hypertext Transfer Protocol (HTTP) as the transport protocol for these video chunks. For example, 'chunks' or 'chunk files' may be short sections of media retrieved in an HTTP request by an adaptive bit rate client. In some cases these chunks may be standalone files, or may be sections (i.e. byte ranges) of one much larger file. For simplicity the term 'chunk' is used to refer to both of these cases (many small files or fewer large files).

The example adaptive bit rate system 700 depicted in FIG. 7 includes live content source 702, VOD content source 704, HTTP origin server 713 and cable modem termination system (CMTS) 716. The components between the live content source 702, VOD content source 704 and the access network 720 in the adaptive bit rate system 700 (e.g., ABR transcoder/packagers 706 and 708, HTTP origin server 713 and CMTS 716) may be located in any suitable location or locations. To the extent that they are not co-located, they may communicate over one or more networks such as an IP content delivery network (CDN) (not shown).

The adaptive bit rate system 700 receives content from a content source, represented by the live content source 702 and VOD content source 704. The live content source 702 and VOD content source 704 represents any number of possible cable or content provider networks and manners for distributing content (e.g., satellite, fiber, the Internet, etc.). The illustrative content sources 702 and 704 are non-limiting examples of content sources for adaptive bit rate streaming, which may include any number of multiple service operators (MSOs), such as cable and broadband service providers who provide both cable and Internet services to subscribers, and operate content delivery networks in which Internet Protocol (IP) is used for delivery of television programming (i.e., IPTV) over a digital packet-switched network.

Examples of an access network 720 include networks comprising, for example, managed origin and edge servers or edge cache/streaming servers. The content delivery servers, such as edge cache/streaming server, deliver content and manifest files to ABR clients 722 or 724 via a customer premises gateway such as customer premises gateway 121 and 123. In an illustrative example, access network 720 may include communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links can include, for example, a transmission medium such as an optical fiber, a coaxial cable, or other suitable transmission media or wireless telecommunications. As previously noted, in an exemplary embodiment, access network 720 comprises a hybrid fiber-coax (HFC) network. Customer premises gateways 721 and 723 may incorporate any of a variety of different types of network interfaces depending on the type of access network 7120 that is employed. For instance, customer premises gateways 721 and 723 may include fiber optic network interfaces, cable modems or other types of network interfaces.

The adaptive bit rate client associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.263 (MPEG-2) or ITU-T H.264/MPEG-4, Part 10, Advanced Video Coding (AVC), the High Efficiency Video Coding (HEVC) standard, and extensions of such standards, to transmit and receive digital video information more efficiently. More generally, any suitable standardized or proprietary compression techniques may be employed.

As shown in FIG. 7, the adaptive bit rate system 700 may deliver live content 702*a* to one or more ABR clients 722, 724 over an access network 720 via a path that includes an adaptive bit rate transcoder/packager 108, HTTP origin server 713 and CMTS 716. Likewise, the adaptive bit rate system 700 may deliver VOD content 704*a* to the one or more ABR clients 722, 724 over the access network 720 via a path that includes an adaptive bit rate transcoder/packager 706, HTTP origin server 713 and the CMTS 716. Generally, an adaptive bit rate transcoder/packager is responsible for preparing individual adaptive bit rate streams. A transcoder/packager is designed to encode, then fragment, or "chunk," media files and to encapsulate those files in a container expected by the particular type of adaptive bit rate client. Thus, a whole video may be segmented in to what is commonly referred to as chunks or adaptive bit rate fragments/segments. The adaptive bit rate fragments are available at different bit rates, where the fragment boundaries are aligned across the different bit rates so that clients can switch between bit rates seamlessly at fragment boundaries. The adaptive bit rate system generates or identifies the media segments of the requested media content as streaming media content.

Along with the delivery of media, the packagers 706 and 708 create and deliver manifest files to the HTTP origin server 713. The packager creates the manifest files as the packager performs the chunking operation for each type of adaptive bit rate streaming method. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file chunks/segments that are available to the client. The ABR client determines which format the client desires, as listed in the main manifest, finds the corresponding profile manifest and location, and then retrieves media segments referenced in the profile manifest.

The ABR transcoder/packagers 706 and 708 create the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In HLS, for example, the adaptive bit rate system 700 receives a media request from a subscriber's ABR client and generates or fetches a manifest to send to the subscriber's playback device in response to the request. A manifest can include links to media files as relative or absolute paths to a location on a local file system or as a network address, such as a URI path. In HLS, an extended m3u format is used as a non-limiting example to illustrate the principles of manifest files including non-standard variants.

The ABR transcoder/packagers 706 and 708 post the adaptive bit rate chunks associated with the generated manifest file to HTTP origin server 713. Thus, the HTTP origin server 713 receives video or multimedia content from one or more content sources via the ABR transcoders/packagers 706 and 708. The HTTP origin server 713 is communicatively linked to a location such as CMTS 716, which serves as the location from which the content can be accessed by the adaptive bit rate clients 722, 724.

When the techniques for making available a program at different rating levels as described herein are applied to ABR systems such as shown in FIG. 7, the links to the media files for the alternate audio or video segments may be included in the manifest. The manifest may also include the descriptor that specifies the different versions of the program that are available as well as the splice points. Conventional ABR tools, typically employed for ad insertion, enable the precise location of the boundaries to be identified. For instance, in these systems, a rating tag included in the client's http/https URL requests is received by a manifest manipulator in the service provider's network that is normally used for ad insertion. The manifest manipulator can make the necessary "track" decisions on the fly, insuring that each client device gets the appropriately rated content. Moreover, because ABR systems typically have multiple video profiles (often 3-12 or more) available in order to accommodate varying network bandwidth capacity, the storage savings in origin and content distribution networks (CDN) can be significant. In some cases the differently rated versions of a program may have their own profile manifest that identifies the media files for that version of the program.

The user of the techniques described herein may also be beneficial to content producers because it allows them to produce a single master version of their content at the time of production. The master version will have all the variations required for their typical distribution channels (theaters, pay-per-view, Blu-ray/DVD, premium channels, broadcast channels (edited for TV), airplane entertainment, etc.). That is, the master version will include a master video and audio track (which may be, for instance, the primary theater version). All the alternate video/audio segments, including any full scenes that may need to be marked for deletion, can be included in the accompanying metadata. Downstream distributors of the content would have the option of using this master version as-is, in which case the selection of a particular rating level can be made by the client device as described herein. Alternately, the master version could be run through a processor to extract a single audio-visual program having a rating which, as an example, might be appropriate for broadcast TV distribution in a system without parental control capabilities, or where the network and client device enhancements required to support the dynamic solution described herein have not been implemented.

In some embodiments, the default rating level that is presented can be dynamic. As an example, from 5 am-9 pm, the default rating level of any program being presented may be TV-PG, and from 9 pm-5 am, the default rating may be unrated. Thus, when the adults are watching a program late at night, they automatically are presented with the unrated content, while in the other hours, they are automatically presented with the TV-PG content.

Figure 8:
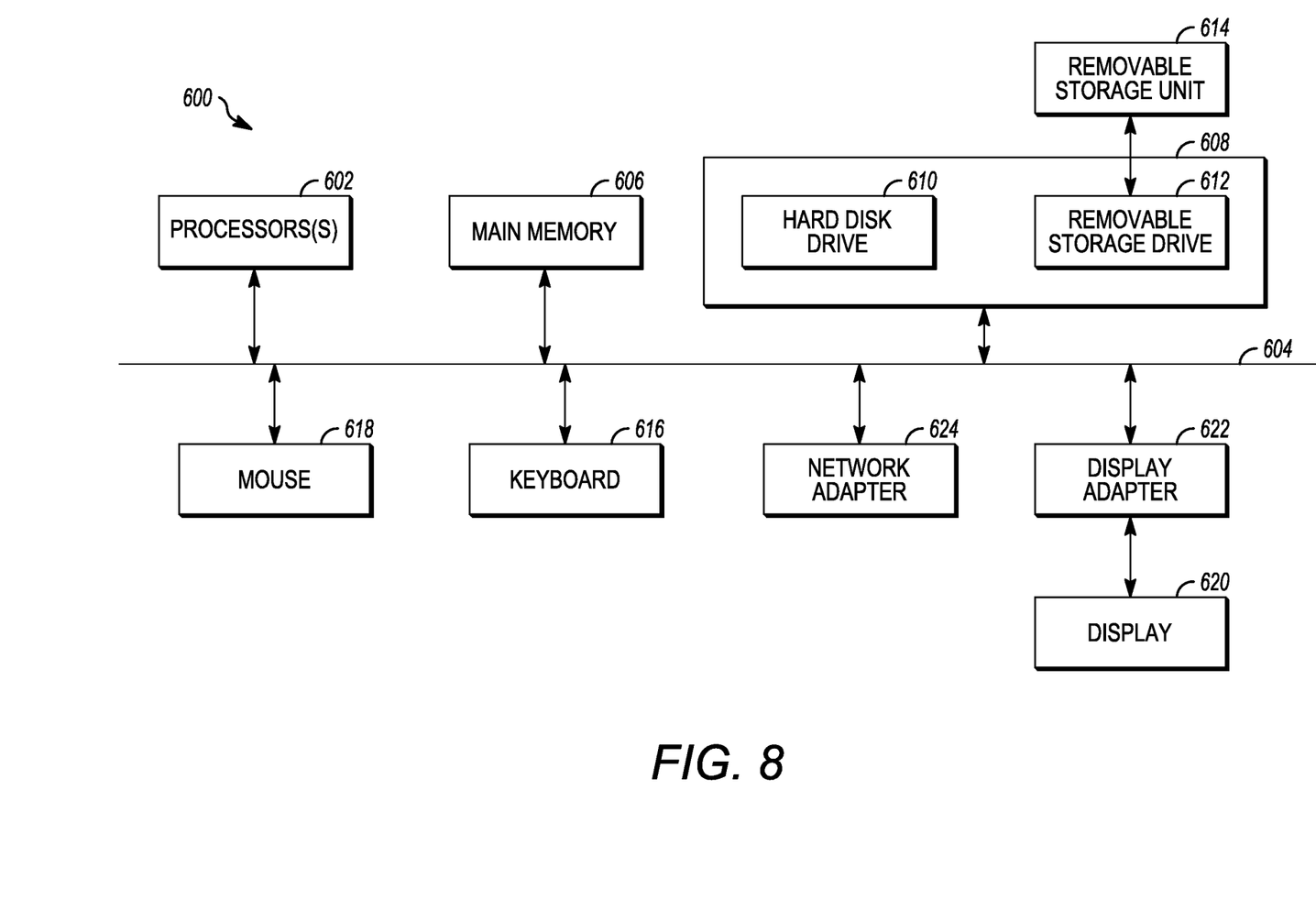
FIG. 8 illustrates a block diagram of one example of a computing apparatus that may be configured to implement or execute one or more of the processes performed by any of the various devices shown herein.

FIG. 8 illustrates a block diagram of one example of a computing apparatus 600 that may be configured to implement or execute one or more of the processes performed by any of the various devices shown herein, including but not limited to the client devices and the various components and devices shown in the different content distribution networks depicted herein. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in the methods described herein. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 410 and/or a removable storage drive 612, where a copy of the program code for one or more of the processes depicted in herein may be stored. The removable storage drive 612 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for presenting a program on a display and at least one audio device, the program having a selected program rating, the method comprising:

receiving a user request through a client device to present a program at a requested at least one program rating level, the requested at least one program rating level associated with at least one of video for a program or audio for a program;

if the requested at least one program rating level includes only one program rating level associated with audio for the program, selecting from among a plurality of different versions of the program a version that corresponds to the requested program rating level and causing the selected version of the program to be presented on at least one of the display device and the at least one audio device; and if the requested at least one program rating level includes more than one program rating level associated with audio for the program, selecting from among the plurality of different versions of the program the versions that correspond to the requested more than one program rating level and causing the differing audio associated with the requested more than one program rating level to be presented through different at least one audio devices and causing an automatically selected one of the differing video associated with the requested more than one program rating level to be presented on the display device associated with the client device.

2. The method of claim 1, further comprising receiving the program over a network in a transport stream that includes at least a first video stream, a first corresponding audio stream and at least one alternate video stream and/or audio stream, wherein selecting from among the plurality of different versions includes selecting the first video stream or the first audio stream and, if the first audio stream is selected, selecting the alternate video stream and if the first video stream is selected, selecting the alternate audio stream, the alternate audio or video stream being selected so that the program is presented with the selected program rating level.

3. The method of claim 1, further comprising receiving the program over a network in a transport stream that includes a primary video stream and a corresponding primary audio stream and at least one alternate audio segment or alternate video segment that is respectively substitutable for a corresponding audio segment in the primary audio stream or a corresponding video segment in the primary video stream, wherein causing the selected version to be presented includes presenting the primary audio and video streams while replacing the corresponding video segment with the alternate video segment or replacing the corresponding audio segment with the alternate audio segment.

4. The method of claim 2, wherein selecting the at least one alternative video or audio stream includes specifying a packet identifier (PID) for the at least one alternative video or audio stream.

5. The method of claim 1, wherein the program includes a primary audio stream and primary video stream, the program being provided in an adaptive bit rate (ABR) transport stream and further comprising receiving a manifest that includes links to media files that specify at least one alternate audio segment or alternate video segment that is respectively substitutable for a corresponding audio segment in the primary audio stream or a corresponding video segment in the primary video stream so that the program conforms to the selected program rating level, wherein causing the selected version to be presented includes requesting the media file for the at least one alternate audio segment or alternate video segment.

6. The method of claim 1, receiving the user request through the client device to present the program further includes presenting a plurality of predetermined rating levels to the user from which the user selects the selected version of the program.

7. The method of claim 6, wherein the predetermined rating levels are government established rating levels.

8. The method of claim 3, wherein the transport stream includes a rating descriptor specifying the at least one alternate audio or video segment that is available to substitute for the corresponding audio segment or the corresponding video segment, respectively, the descriptor indicating a splice in point and duration of the at least one alternate audio or video segment.

9. The method of claim 8, wherein the transport stream further includes an indicator denoting the splice in point.

10. The method of claim 1, wherein the automatically selected one of the differing video associated with the requested more than one program rating level presented on the display device corresponds to the lowest rated one of the requested more than one program rating level.

* * * * *